United States Patent

Matsumoto et al.

[11] Patent Number: 5,795,526
[45] Date of Patent: Aug. 18, 1998

[54] PROCESS FOR PRODUCING MULTILAYER MOLDED ARTICLE

[75] Inventors: Masahito Matsumoto, Ibaraki; Nobuhiro Usui; Seiji Terashima, both of Takatsuki, all of Japan

[73] Assignee: Sumitomo Chemical Company, Limited, Osaka, Japan

[21] Appl. No.: 724,584

[22] Filed: Sep. 30, 1996

Related U.S. Application Data

[63] Continuation of Ser. No. 318,803, Oct. 17, 1994, abandoned.

[30] Foreign Application Priority Data

Feb. 19, 1993 [JP] Japan ............... 5-030498

[51] Int. Cl.$^6$ .................. B29C 45/64; B29C 45/73
[52] U.S. Cl. ...................... 264/266; 264/328.7
[58] Field of Search ................ 264/250, 259, 264/255, 266, 294, 328.1, 328.7, 316, 319, 328.14, 328.16

[56] References Cited

U.S. PATENT DOCUMENTS

| | | | |
|---|---|---|---|
| 5,034,076 | 7/1991 | Masui et al. | 264/266 |
| 5,292,465 | 3/1994 | Kobayashi et al. | 264/266 |
| 5,352,397 | 10/1994 | Hara et al. | 264/266 |
| 5,401,457 | 3/1995 | Valyi | 264/266 |
| 5,453,240 | 9/1995 | D'Hooren | 264/266 |

FOREIGN PATENT DOCUMENTS

| | | |
|---|---|---|
| 57-66914 | 4/1982 | Japan. |
| 59-49916 | 3/1984 | Japan. |
| 59-150740 | 8/1984 | Japan. |
| 61-137714 | 6/1986 | Japan. |

*Primary Examiner*—Angela Ortiz
*Attorney, Agent, or Firm*—Cushman, Darby & Cushman IP Group Pillsbury, Madison & Sutro LLP

[57] ABSTRACT

A process for producing a multilayer molded article in which a skin material is laminated to the surface of a thermoplastic resin core material which comprises feeding the skin material to the cavity of a pair of female and male molds which are not closed, subsequently feeding the molten thermoplastic resin to the cavity of the molds through a resin passageway provided in the molds, clamping both molds to shape the molten resin in the cavity of the molds and then cooling the resin under pressure, characterized in that the cooling under pressure is conducted so that the temperature for feeding the molten thermoplastic resin to the cavity of the molds is in the range of from 175° to 195° C., the clamping pressure at completion of the shaping is in the range of from 30 to 95 kg/cm$^2$ and the product of the clamping pressure and the pressing time is in the range of from 100 to 1,500 kg/cm$^2$.sec.

7 Claims, 1 Drawing Sheet

PROCESS FOR PRODUCING MULTILAYER MOLDED ARTICLE

This is a continuation of application Ser. No. 08/318,803, filed on Oct. 17, 1994, which was abandoned upon the filing hereof.

TECHNICAL FIELD

This invention relates to a process for producing a multilayer molded article consisting of a skin material and a thermoplastic resin core material which is used in interior automotive trims, domestic appliances and the like.

BACKGROUND ART

Multilayer molded articles consisting of a skin material and a thermoplastic core material layer have been used in large amounts in all fields including interior automotive trims and domestic appliances because of their economics, lightweight properties and good shapeability.

Such multilayer molded articles have been produced, as disclosed in, for example, Japanese Patent Application Kokai No. 1-235,613, by a method which comprises feeding a molten thermoplastic resin to between a pair of female and male molds to which a skin material has been fed, clamping both the molds to shape the molten resin in the interior of the molds, simultaneously laminating the skin material to the surface of the resin and thereafter cooling and solidifying the molten resin.

However, in the heretofore known methods, in some cases, deformation is caused in the multilayer molded article obtained and the feeling is impaired, and this has greatly affected the productivity.

DISCLOSURE OF THE INVENTION

Under such circumstances, the present inventors have made extensive research to produce a multilayer molded article retaining its good surface appearance, and have consequently found that the above object can be achieved by controlling the temperature for feeding the molten thermoplastic resin to the cavity of the molds, the clamping pressure and the pressing time, whereby this invention has been reached.

BEST MODE FOR PRACTICING THE INVENTION

Figure 1:
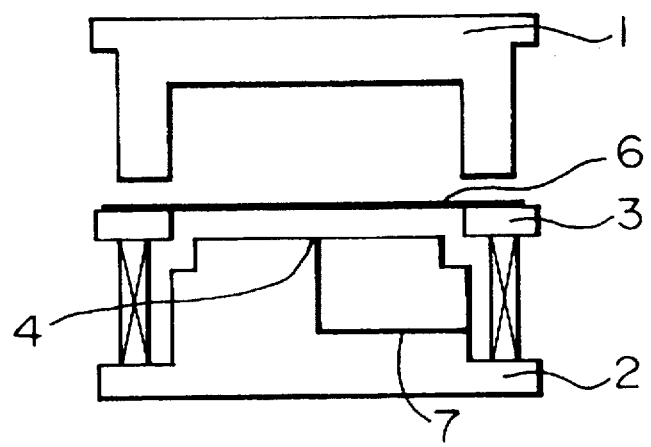
FIG. 1 is a sketch drawing of the production process of this invention and shows the state that a skin material 6 is placed between a female mold 1 and a male mold 2 which are not closed.

This invention provides a process for producing a multilayer molded article in which the skin material is laminated to the surface of a thermoplastic resin which comprises feeding a skin material to the cavity of a pair of female and male molds which are not closed, thereafter feeding a molten thermoplastic resin to the cavity of the molds through a resin passageway provided in the molds, clamping both the molds to shape the molten resin in the cavity of the molds, and then cooling the resin under pressure, characterized in that the cooling under pressure is conducted so that the temperature for feeding the molten thermoplastic resin to the interior of the molds is in the range of from 175° to 195° C., the clamping pressure in the shaping is in the range of from 30 to 95 kg/cm$^2$ and the product of the clamping pressure and the pressing time after completion of the shaping is in the range of from 100 to 1500 kg/cm$^2$.sec.

The thermoplastic resin used in this invention may be any one which is generally used in injection molding, compression molding, extrusion molding and the like and various thermoplastic resins can be used without particular limitation; however, polypropylene resins are preferably used.

Said thermoplastic resins may be used alone, may be compounded with inorganic fillers such as talc, glass fiber, calcium carbonate and the like, or may, of course, be appropriately compounded with additives such as stabilizer, pigment and the like which are usually used.

When a polypropylene resin is used as the thermoplastic resin, it is preferable to use a polypropylene resin or polypropylene resin composition having a melt flow index (MI) at 230° C. ranging from 15 to 200 g/10 minutes.

The skin material in this invention is not particularly limited, and various materials are used.

For example, woven fabrics, knitted fabrics, non-woven fabrics, sheets or films of various thermoplastic resins and thermoplastic elastomers are mentioned, and those having convex-concave patterns such as emboss and the like can be used. Moreover, foams of thermoplastic resins such as polyolefin, polyvinyl chloride, polystyrene and the like, foams of thermosetting resins such as polyurethane and the like and foams of rubbers such as cis-1,4-polybutadiene, ethylenepropylene copolymer and the like can be used. Furthermore, these can be used alone or in the form of a laminate of two or more thereof.

The particularly preferable skin material is a laminate prepared by backing a polyvinyl chloride sheet or a polypropylene thermoplastic elastomer sheet as a skin material with a polypropylene foam sheet. In such a laminate, the thickness of the sheet as the skin material is preferably 0.3–0.8 mm, and the foam sheet as a backing has preferably a thickness of about 2–5 mm and a expansion ratio of about 3–30 which is varied depending upon the material resin.

Incidentally, when such a skin material is used, the skin material may be previously subjected to preheating for adjusting the tensile stress, elongation and the like and also to preshaping.

An example of a process for producing a multilayer molded article in this invention is explained below.

The apparatus to be used in the production process of this invention consists of a male mold 2 and a female mold 1 as shown in, for example, FIG. 1. In the outer peripheral part of the male mold 2, a clamper 3 which fixes the skin material and can be moved in the clamping direction with oil pressure, air pressure, spring or the like is arranged. This clamper 3 is used in response to the complexity of the shape of molded article. On this clamper 3, pins (not shown in figure) may be placed for controlling the elongation of the skin material 6, or the elongation of the skin material 6 may be adjusted by sandwiching the skin material in between the clamper 3 and the female mold 1 and adjusting the nipping force. Also, a feed opening 4 for the molten resin is provided in the male mold. Further, if necessary, a cooling tube (not shown in figure) may be provided in one or both of the molds.

A production example in which such an apparatus is used is explained below.

Figure 2:
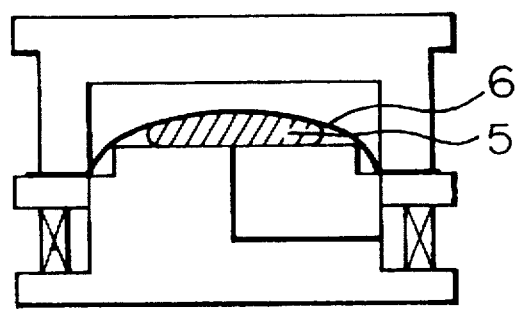
FIG. 2 is a sketch drawing of the production process of this invention and shows the state that a molten thermoplastic resin 5 is fed from a resin feed opening to between the skin material 6 and the cavity surface of the male mold 2 through a resin passageway 7.

First of all, the skin material 6 is positioned between the male and female molds which are in the open state (FIG. 1). Subsequently, the female mold 1 is lowered to an appropriate position, and the molten thermoplastic resin 5 at 175°–195° C. is fed from the feed opening 4 for the molten resin provided in the mold to a cavity between the skin material 6 and the male mold 2 through a passageway 7 for the molten thermoplastic resin (FIG. 2).

At this time, when the temperature for feeding the molten thermoplastic resin is in the outside of this range, the molded article obtained tends to be deformed or the feeling thereof becomes apt to be impaired.

The cavity clearance formed by the male mold and the female mold in the feeding of the molten resin is preferably in the range of from 5 to 100 mm.

Figure 3:
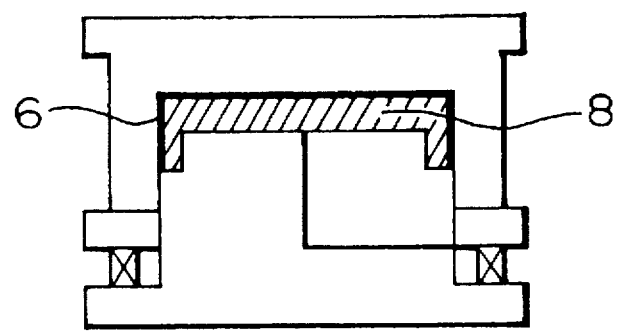
FIG. 3 is a sketch drawing of the production process of this invention and shows the state of cooling under pressure at completion of the shaping after the feeding of the molten thermoplastic resin and thereafter.

Subsequently, substantially simultaneously with or after completion of the feeding of the molten resin, the female mold 1 is lowered to close the molds, thereby pressing the molten thermoplastic resin 5 to extend the resin in the cavity of the molds, whereby the resin is shaped (FIG. 3). The pressure at the press surface is gradually increased as the female mold is lowered to extend the molten resin in the cavity of the molds, and the shaping is completed when the clamping pressure reaches the predetermined pressure. The clamping pressure when the shaping has been completed is set so as to fall in the range of from 30 to 95 kg/cm². Also, the speed of lowering the female mold 1 is preferably adjusted so that the time from completion of the feeding of the molten resin to completion of the shaping becomes about 1 to 3 seconds.

Immediately after completion of the shaping, the cooling under pressure is effected. The control of the clamping pressure and the pressing time in the cooling under pressure is very important. Firstly, the clamping pressure is adjusted to the same as or lower than the predetermined pressure at the time of completion of the shaping of the molten resin, and this clamping pressure may be constant during the pressing or may be varied during the pressing. When the clamping pressure is changed the clamping pressure may be 0 in either stage during pressing.

Secondly, the pressing time is set in response to the clamping pressure during the cooling under pressure so that the product of the clamping pressure and the pressing time fall within the range of from 100 to 1,500 kg/cm².sec. When the product of the clamping pressure and the pressing time at this time is less than 100 kg/cm², the deformation of the multilayer molded article obtained becomes great and when it exceeds 1,500 kg/cm², the feeling of the skin material of the multilayer molded article is remarkably impaired.

When the clamping pressure is constant during the cooling under pressure, it is necessary for the product of the clamping pressure and the pressing time to fall within the above range, and when the clamping pressure is changed during the cooling under pressure, it is necessary for the total sum of the products of the clamping pressure and the pressing time under the respective conditions for cooling under pressure to fall within the above range.

Incidentally, the cooling may be effected by forced cooling, for example, passing a cooling medium such as water or the like through a cooling tube (not shown) previously provided in both molds, sending air from the exterior of the molds, or the like, or may be effected by spontaneous cooling at room temperature. As the cooling method, the optimum method may be selected taking into consideration various conditions including the resin temperature, the thickness of molded article, the predetermined temperature of the molds and the like.

After the cooling under pressure, the female mold is lifted to open the molds and a multilayer molded article 8 consisting of the thermoplastic resin core material and the skin material is taken out.

Incidentally, the apparatus explained above and the production process using the same are working modes of this invention and it is needless to say that this invention is not limited to the said apparatus and process.

According to this invention, a multilayer molded article retaining its good surface appearance can be obtained in the process for obtaining a multilayer molded article in which a skin material is laminated to the surface of a thermoplastic resin core material by previously feeding the skin material to between the upper and lower molds, thereafter feeding the molten resin and clamping the molds to press the resin.

WORKING EXAMPLE

This invention is explained in more detail below based on Examples; however, needless to say, this invention is not limited thereby.

Example 1

By the process shown in FIGS. 1 to 3, a multilayer molded article consisting of a skin material and a thermoplastic resin core material was produced.

As the thermoplastic resin for the core material, polypropylene (Sumitomo Noblen BPZ5077, MI (230° C.)=45, manufactured by Sumitomo Chemical Co., Ltd.) was used and as the skin material, a laminate sheet prepared by heat-laminating a polypropylene thermoplastic elastomer sheet having a thickness of 0.6 mm to a polypropylene foam sheet (Toray Pef PPAM20030, expansion ratio: 20, thickness: 3 mm, manufactured by TORAY INDUSTRIES, INC.) was used.

First of all, the skin material 6 was positioned between the male and female molds which were in the open state, then the female mold 1 was lowered and the molten polypropylene 5 was fed to the cavity between the skin material 6 and the male mold 2 from the feed opening 4 for the molten resin provided in the male mold 2.

Subsequently, substantially simultaneously with completion of the feeding of the molten polypropylene, the female mold 1 was lowered to close the molds, whereby the molten polypropylene 5 was pressed and extended in the cavity of the molds to be shaped.

After completion of the shaping, the resin was cooled under pressure.

After the cooling under pressure, the female mold was opened to obtain a multilayer molded article 8 consisting of the polypropylene core material and the skin material.

The molding conditions in this case were as follows:

Molten polypropylene temperature: 190° C.

Mold temperature: Female mold 30° C., male mold 40° C.

Clamping pressure at completion of shaping: 85 kg/cm²

Pressing conditions after completion of shaping: 85 kg/cm²×2 sec and 0 kg/cm²×38 sec (Total sum of the products of the clamping pressure and the pressing time: 170 kg/cm².sec)

In the multilayer molded article obtained, no breakage of the skin material was observed and the appearance thereof was good.

Comparative Example 1

In the same manner as in Example 1, except that the molten polypropylene temperature was changed to 205° C., a multilayer molded article was produced. In the multilayer molded article obtained, the polypropylene foam layer of the skin material was broken and pitting was caused on the surface.

Comparative Example 2

In the same manner as in Example 1, except that the clamping pressure during the shaping and the pressing conditions after completion of the shaping were changed to the following conditions, a molded article was produced:

Clamping pressure at completion of shaping: 60 kg/cm$^2$

Pressing conditions after completion of the shaping: 60 kg/cm$^2 \times$1.5 sec and 0 kg/cm$^2 \times$38 sec (the total sum of the products of the clamping pressure and the pressing time: 90 kg/cm$^2$.sec)

In the multilayer molded article obtained, no breakage of the polypropylene foam layer of skin material was observed; however, a great deformation was caused.

Example 2

By the process shown in FIGS. 1 to 3, a multilayer molded article consisting of a skin material and a thermoplastic resin core material was prepared.

As the thermoplastic resin for core material, polypropylene (Sumitomo Noblen BPZ5077, MI (230° C.)=45) was used and as the skin material, a laminate sheet prepared by heat-laminating a polyvinyl chloride sheet having a thickness of 0.5 mm to a polypropylene foam sheet (Toray Pef PPAM20030, expansion ratio: 20, thickness: 3 mm, manufactured by TORAY INDUSTRIES, INC.) was used.

In the same manner as in Example 1, except that the molding conditions were as follows, molding treatment was conducted:

Molten polypropylene temperature: 185° C.

Mold temperature: Female mold 25° C., male mold 60° C.

Clamping pressure at completion of shaping: 75 kg/cm$^2$

Pressing conditions after completion of shaping: 75 kg/cm$^2 \times$3 sec and 10 kg/cm$^2 \times$35 sec (the total sum of the products of the clamping pressure and the pressing time: 575 kg/cm$^2$.sec)

In the multilayer molded article obtained, no breakage of the skin material was observed, and there was no deformation, and the appearance was good.

Example 3

By the process shown in FIGS. 1 to 3, a multilayer molded article consisting of a skin material and a thermoplastic resin core material was prepared.

As the thermoplastic resin for core material, polypropylene (Sumitomo Noblen BTE71, MI (230° C.)=70) was used and as the skin material, a laminate sheet prepared by heat-laminating a polyvinyl chloride sheet having a thickness of 0.5 mm to a polypropylene foam sheet (Toray Pef PPAM20030, expansion ratio: 20, thickness: 3 mm, manufactured by TORAY INDUSTRIES, INC.) was used.

In the same manner as in Example 1, except that the molding conditions were as follows, molding treatment was conducted:

Molten polypropylene temperature: 179° C.

Mold temperature: Female mold 30° C., male mold 40° C.

Clamping pressure at completion of shaping: 80 kg/cm$^2$

Pressing conditions after completion of shaping: 80 kg/cm$^2 \times$10 sec and 10 kg/cm$^2 \times$30 sec (the total sum of the products of the clamping pressure and the pressing time: 1100 kg/cm$^2$.sec)

In the multilayer molded article obtained, no breakage of the skin material was observed, and there was no deformation, and the appearance was good.

Comparative Example 3

In the same manner as in Example 2, except that the molding conditions were as follows, to produce a multilayer molded article:

Molten polypropylene temperature: 190° C.

Mold temperature: Female mold 25° C., male mold 60° C.

Clamping pressure at completion of shaping: 75 kg/cm$^2$

Pressing conditions after completion of shaping: 75 kg/cm$^2 \times$20 sec and 20 kg/cm$^2 \times$20 sec (the total sum of the products of the clamping pressure and the pressing time: 1900 kg/cm$^2$.sec)

In the multilayer molded article obtained, the polypropylene foam layer was broken and pitting was caused on the surface.

We claim:

1. A process for producing a multilayered molded article in which a skin material is laminated to the surface of a thermoplastic resin, said process comprising the steps of:

feeding the skin material to the cavity defined by female and male molds which are not closed, and subsequently feeding a molten thermoplastic resin to the cavity of the molds through a resin passageway provided in at least one of the molds;

clamping both molds to shape the molten resin in the cavity at a first clamping pressure, and then cooling the resin under pressure; and reducing the first clamping pressure to a second clamping pressure after the molten resin has been shaped and during said step of cooling the resin, wherein said step of cooling the resin under pressure is conducted so that a temperature for said step of feeding the molten thermoplastic resin to the cavity of the molds is in a range of from 175° to 195° C., wherein the clamping pressure at completion of the shaping is in a range of from 30 to 95 kg/cm$^2$, and wherein a product of the clamping pressure and the pressure time after completion of the shaping is in a range of from 100 to 1,500 kg/cm$^2$.sec.

2. The process for producing a multilayer molded article according to claim 1, wherein the thermoplastic resin is a polypropylene resin.

3. The process for producing a multilayer molded article according to claim 2, wherein the melt flow index (MI) of the polypropylene resin at 230° C. is in the range of from 15 to 200 g/10 min.

4. The process for producing a multilayer molded article according to claim 1, wherein the skin material is a laminate prepared by backing the skin material with foam.

5. The process for producing a multilayer molded article according to claim 4, wherein the thickness of the foam is in the range of from 2 to 5 mm, and the foam has an expansion ratio in the range of from 3 to 30.

6. The process for producing a multilayer molded article according to claim 4, wherein the foam is a foam of thermoplastic resin, a foam of at least one member selected from the group consisting of a thermosetting resin, and a rubber.

7. The process for producing a multilayer molded article according to claim 4, wherein the skin material is a polyvinyl chloride sheet or a polypropylene thermoplastic elastomer sheet and the foam is a polypropylene foam sheet.

* * * * *